United States Patent [19]

Francel et al.

[11] 3,778,242

[45] Dec. 11, 1973

[54] LOW TEMPERATURE SEALANT GLASS FOR SEALING INTEGRATED CIRCUIT PACKAGE PARTS

[75] Inventors: Josef Francel, Toledo; Lester C. Minneman, Maumee; Neil Brian Nofziger, Toledo, all of Ohio

[73] Assignee: Owens-Illinois, Inc., Toledo, Ohio

[22] Filed: Dec. 30, 1970

[21] Appl. No.: 102,886

[52] U.S. Cl. .................. 65/43, 106/39.6, 106/47 R, 106/53

[51] Int. Cl. ....... C03c 27/00, C03c 3/12, C03c 3/30

[58] Field of Search .............. 106/39 DV, 53, 47 R; 65/43

[56] References Cited

UNITED STATES PATENTS

| | | | |
|---|---|---|---|
| 3,061,664 | 10/1962 | Kegg | 106/53 |
| 3,250,631 | 5/1966 | Lusher | 106/53 |
| 3,291,586 | 12/1966 | Chapman et al. | 106/39 DV |
| 3,462,252 | 8/1969 | Veres | 106/39 DV |

*Primary Examiner*—A. B. Curtis
*Assistant Examiner*—Mark Bell
*Attorney*—Richard B. Dence and E. J. Holler

[57] ABSTRACT

Provided are sealing glass compositions particularly useful for sealing together alumina ceramic components in microelectronic circuitry. The sealing glass compositions are crystallizable and comprise a devitrifiable solder glass admixed with (1) a refractory material and (2) a pre-crystallized glass which together are employed in an amount sufficient to substantially reduce the time necessary to effect in situ crystallization and at the same time form a strong hermetic seal. The sealing glass compositions may be employed in any conventional form and are fired at about 400°–500° C. for about one minute to less than about 60 minutes to form a seal as described.

18 Claims, No Drawings

LOW TEMPERATURE SEALANT GLASS FOR SEALING INTEGRATED CIRCUIT PACKAGE PARTS

This invention relates to sealing glass compositions and methods of using same. More particularly, this invention relates to sealing glass compositions particularly useful for bonding ceramic components in microelectronic circuitry.

Generally speaking, this invention represents an improvement upon U.S. Pat. No. 3,250,631 and commonly owned co-pending application Ser. No. 814,156 filed Apr. 7, 1969, now abandoned in favor of continuating application Ser. No. 211,656 filed Dec. 23, 1971. The disclosures of both of these documents are incorporated herein by reference.

It has long been known that sealing or solder glasses are advantageous means for sealing together pieces of material such as glass, ceramic, metal or the like. Many solder glasses have therefore been developed which have the ability to soften and flow at temperatures significantly below the deformation temperature of the components which they bond so as to cause a minimum of damage during the heat-sealing operation. When such solder glasses are those of the vitreous type, they are often insufficiently strong to withstand the rigors of use to which the ultimate article is put. In addition, these solder glasses often have coefficients of expansion which are much higher than those of the components which they bond together. Thus, upon cooling after heat-sealing is completed, undue stresses are set up in the glasses further weakening them. In order to overcome some of the problems occurring with vitreous solder glasses, the art has developed several solder glasses which are initially vitreous but which crystallize in situ during heat-sealing. Such in situ crystallization tends to strengthen the seal structure and lower the coefficient of expansion of the seal, thus bringing it more nearly into accordance with the components which then bond together.

In many instances, and regardless of whether vitreous or crystallized (i.e., devitrified) solder glass seals are employed, the components which they bond together are often used to encapsulate, or are otherwise connected with, delicate heat-sensitive parts such as electronic equipment, microelectronic circuitry, cathodoluminescent surfaces and the like. To such components any increase in temperature experienced in their environment is determined and undesirable. Thus, the use of heat-sealing solder glasses is, by its very nature, a detriment to the system. This, of course, is also true when heat sensitive components are not present since the factors of time and temperature are also economic in nature. On the other hand, and in many instances, the advantages of using solder glasses over other known sealing techniques so override the detriment of heat-sealing that such a detriment is tolerated as a necessary limit upon ultimate quality. While this detriment is tolerated, it is of course always a desired end result in the development of any new solder glass not only to better its physical characteristics, but also to minimize the time and/or temperature of heat-sealing. Obviously then, the worth of any solder glass may be measured not only by its strength of bond, ability to hermetically seal, reproducibility and the like, but also upon its ability to be heat-sealed at a minimum temperature within a minimum period of time.

U.S. Pat. No. 3,250,631, incorporated hereinabove by reference, discloses a valuable and advantageous technique for reducing the coefficient of expansion of a devitrifiable solder glass without adversely affecting its sealing properties including the time-temperature factor in heat-sealing. Thus, this patent provides the ability to match a solder glass to particular substrates without detrimentally affecting the properties of the seal or the factors involved in forming the seal. This is generally accomplished by adding to a thermally devitrifiable solder glass a sufficient amount of an inert refractory material, such as an inert refractory oxide, to lower the thermal coefficient of expansion of the solder glass to the desired, matching value without affecting the sealing temperature, flow characteristics, or other sealing properties of the solder glass.

Specifically mentioned refractory oxides are beta eucryptite and fused quartz. Preferably, the devitrifiable solder glasses are of the lead-zinc-borate type usually having a weight percent of about 70–80 percent PbO; 7–16 percent ZnO; and 7–10 percent $B_2O_3$. Other oxides such as BaO, CaO, CuO, $SiO_2$, $SnO_2$, $Bi_2O_3$, and similar fluxes, colorants, and the like, may be included in the solder glass. These glasses form excellent seals when heat-sealed at 425° C. for one hour. Generally speaking, the components sealed with these solder glasses and the solder glasses themselves are extremely versatile since they have thermal coefficients of expansion (0°–300° C.) preferably ranging from about $80 \times 10^{-7}$ to $120 \times 10^{-7}$ in./in./° C.

Commonly owned co-pending application Ser. No. 814,156 filed Apr. 7, 1969, incorporated hereinabove by reference, discloses a technique of precisely controlling and generally increasing the rate of crystallization of a solder glass composition. Thus, this co-pending application particularly attacks the time-temperature detriment discussed hereinabove relative to solder glasses as well as increasing the desired quality of precise predictability of crystallization. Basically, the rate of crystallization is controlled and advantageously increased by uniformly dispersing from about 1–10 parts by weight of a pre-crystallized glass particle in about one million parts by weight of thermally uncrystallized but crystallizable glass particles. For precise predictability of crystallization, blending is maximized and particle size is carefully controlled such that essentially all particles are entirely of −100 U.S. Series Sieve screen size and such that between about 65–78 weight percent of such particles are of −325 U.S.Series Sieve screen size.

Preferably, a thermally crystallizable glass composition blend is initially produced by a process involving the steps of providing a quantity of uncrystallized chips of crystallizable glass having a thickness of about 20–25 mils, and a quantity of essentially fully crystallized glass having a particle size ranging between about −20 to +80 U.S. Series Sieve screen size; reducing the particle size of the uncrsytallized glass and fully crystallized glass to a particle size range as indicated; blending the fully crystallized glass particles together with the uncrystallized glass particles in a ratio of between about 100–225 parts by weight of crystallized glass particles to one million parts by weight of uncrystallized glass particles to produce a uniform "master blend" of finely comminuted crystallized and uncrystallized glass particles. The "master blend" is then used for blending with the remaining amount of uncrystallized particles of thermally crystallizable glass having a composition similar to that of the "master blend" and having the same indicated particle size, the final blend being effected to insure the presence of the indicated amount of crystallized glass in the final composition.

The crystallized glass, preferably of the same composition as the uncrystallized glass may be pre-crystallized in accordance with conventional devitrification techniques. Preferably, the glasses used are those of the lead-zinc-borate type similar to those used in U.S. Pat. No. 3,250,631. These glasses are advantageously pre-crystallized by heating finely comminuted particles of the crystallizable glass in a layer of about one-sixteenth inches in thickness for 2 hours at 852° F.

Heat sealing using the above-described blended solder glass can be effected at about 425° C. for about 20–50 minutes. Such a heat-sealing represents a significant decrease in time without a significant increase in temperature.

The art of sealing microelectronic circuitry within ceramic components has presented special problems, especially with the advent of alumina as a ceramic component. Firstly, these ceramics generally have very low thermal coefficients of expansion (e.g., alumina ceramics vary from about 60–80 $\times 10^{-7}$ in./in./° C. at 0°–300° C.). Furthermore, because of the small dimensional limits of the seal and high strength and hermetic properties required, unusually stringent requirements for high strength, reproducibility and hermetic properties are placed upon any solder glass used. In addition, microelectronic circuits are very sensitive to heat, thus the time-temperature factor of heat-sealing presents more than the usual detriment to the system.

While the compositions and techniques of U.S. Pat. No. 3,250,631 provide the microelectronic art with a significant improvement over known solder glasses theretofore used for ceramic (and especially alumina) component sealing, there was a definite need for improvement. While the techniques of this patent provided seals which worked when formed at temperatures around 425°–450° C. for above one hour or more, the time-temperature factor was still relatively high essentially in the microelectronic circuitry art while the ability to consistently reproduce high quality seals with alumina was relatively low.

The compositions and techniques of the aforementioned co-pending application Ser. No. 814,156 also represent an improvement over the known solder glasses. However, while times were generally decreased to a lower level, they were still relatively high especially for the microelectronic circuitry art. In addition, some difficulty is experienced in matching the various thermal coefficients of expansion especially when using the most desired ceramic, alumina, thus to the detriment of the critical need for a strong seal which would remain substantially hermetically tight through the rigors of use. In view of the above, it is evident that there exists a need in the art for a new solder glass composition which eliminates and/or reduces the above-described problems in the sealing art generally and which is better suited to overcome the particularly acute problems in the microelectronic circuitry art more specifically.

This invention fulfills the above-described need in the art by providing certain unique solder glass compositions which have a materially reduced time-temperature heat-sealing factor; which forms strong, tightly hermetic, highly reproducible seals even when used to bond alumina ceramic components in microelectronic circuitry together; and which are found to be highly moisture resistant, thus increasing their life span both during storage and/or actual use. Basically, these results are achieved by combining the techniques disclosed in U.S. Pat. No. 3,250,631 and those of the aforesaid co-pending application Ser. No. 814,156. In so combining these techniques with some preferred modifications, it is surprisingly and quite unexpectedly found that a significant and substantial synergistic effect is achieved both with respect to the reduction of the time-temperature factor during heat-sealing and to the ability to form a highly reproducible, strong hermetically sealed bond between ceramic components especially of the alumina type. Thus, not only does the subject invention unexpectedly improve the general time-temperature factor but is also, quite unexpectedly, fulfills a long felt need in the microelectronic circuitry art.

In view of the above, it can be seen that one aspect of this invention, in its broader sense, contemplates a unique solder glass composition which comprises an uncrystallized but crystallizable solder glass modified with an inert refractory material and a pre-crystallized glass.

The uncrystallized but crystallizable solder glass employed may be any well known solder glass conventional in the art. Preferred solder glasses for the purposes of this invention, especially when joining alumina ceramics, are of the lead-zinc-borate type, a preferred range of ingredients being set forth in the following table:

TABLE A

| Ingredient | Brd. Range | Preferred Range | Specific Example |
|---|---|---|---|
| BaO | 0–3 | 1.5–2.5 | 1.8 |
| $B_2O_3$ | 5–15 | 8–9 | 8.2 |
| PbO | 70–85 | 74–80 | 75.7 |
| $SiO_2$ | 0–10 | 1–2.5 | 2.0 |
| ZnO | 5–20 | 10–13 | 11.8 |

Other oxides such as CaO, CuO, $SnO_2$, $Bi_2O_3$, $Na_2O$, $K_2O$, $Li_2O$, CdO, and $Fe_2O_3$ may be included. However, it is preferred in many instances not to employ these ingredients but rather to provide compositions which consist only of these ingredients set forth in Table A.

The inert refractory materials useful in this invention may be any of such well known materials, synthetic or natural, conventional to the art. Preferably the inert refractory is a refractory oxide and most preferably is beta eucryptite or fused quartz. Of these two specifically named materials, beta eucryptite is preferred. Generally speaking, and for best results, the refractory oxide employed should be capable, when used alone, to decrease the expansion coefficient of the solder glass at least about 15–25 $\times 10^{-7}$ units.

The crystallized (pre-crystallized) glass may generally be any well known crystallized glass, devitrified in accordance with conventional techniques. Preferably, the pre-crystallized glass has the same composition as the uncrystallized glass. With respect to the lead-zinc-borate glasses described above, such are easily crystallized so as to form the pre-crystallized glasses of this invention by heating them for a period of 2 hours at 450° C.

The specific weight percents actually employed of each component of the solder glass compositions of this invention will vary over a wide range depending upon the ultimate environmental factors of use. Generally speaking, a sufficient amount of refractory oxide and pre-crystallized glass should be added such that together they provide the necessary coefficient of expansion match-up, flow properties, and crystallization speed to decrease the normal time-temperature factor of the heat-sealing process while at the same time provide a strong, tightly hermetic, moisture-resistant seal.

Exemplary of a preferred range of ingredients for most contemplated purposes includes by weight percent: about 5–15 percent refractory material, about 0.0001 – 0.03 percent pre-crystallized glass, and about 85–95 percent uncrystallized glass. In a more preferred embodiment which represents a modification of the concept in the aforementioned co-pending application, the ranges are about 7–11 percent refractory material, about 0.02 percent pre-crystallized glass, and about 89–93 percent uncrystallized glass.

The glass compositions of this invention are usually in particulate form and are formulated by blending particles of the various constituents together. Generally speaking, for best results, all particles of all constituents should be less than about 100 U.S. Series Sieve screen in size. More preferably, about 50 percent by weight of all particles should be less than about 325 U.S. Series Sieve screen in size but less than 5 percent by weight smaller than 5 microns. Still more preferably and for best results especially when sealing alumina ceramics, the particles of at least the base uncrystallized solder glass and preferably of all constituents should be reduced such that at least about 70 percent by weight are smaller than 400 U.S.Series Sieve screen but less than about 3.0 percent by weight are smaller than 3 microns. Achievement of the necessary particle sizes is obtainable in accordance with well-known fritting and grinding techniques as for example those disclosed in the aforementioned co-pending application.

The compositions of this invention may be blended in accordance with any conventional technique. However, for best results uniform dispersion of at least the pre-crystallized glass and preferably the refractory material should be employed. This is most conveniently accomplished by making a "master blend" of the pre-crystallized and uncrystallized glass chips such that the pre-crystallized glass is present in an amount of about 100–225 parts by weight of crystallized glass particles to one million parts by weight of uncrystallized glass chips, the particle size being in the order of −20 to +80 U.S.Series Sieve screen size. Thereafter, the comminution and blending may be carried out simultaneously in a suitable mill such as a ball mill. In a like manner, a blend of uncrystallized glass particles and refractory material particles is formulated. The two blends are then admixed in the requisite quantities and mixed using any conventional technique such as a paint shaker or the like. As an alternative, the "master blend" may be admixed in one step with the remaining ingredients with separate formulation of the refractory blend.

The glass compositions so formed as above-described are capable of forming uniquely synergistic seals which in one aspect solve a long felt need in the microelectronic circuitry art. Generally speaking, the time-temperature factor for a given system is significantly reduced usually by a factor at least as high as 1.5. Representative of the reduced time-temperature factor unexpectedly achieved is the fact that for most solder glasses and refractory systems employed sealing is effected at 400°–500° C. with crystallization being substantially completed within about 1–60 minutes. In a preferred form of this invention and when using the preferred glass compositions hereinabove described heat sealing to a strong, hermetically tight, reproducible seal is effected in about 8 min. at 450° C. or about 30 min. at 425° C.

By the term "crystallization substantially completed" is meant crystallization to the extent necessary to achieve the requisite strength and thermal coefficient of expansion. The term "hermetically tight" is defined by Military Standard Test No. 883 which in one instance (without thermal shock) defines hermetically tight as helium leakage less than about $1 \times 10^{-8}$ cc/sec. He.

The solder glass compositions of this invention may be applied to their substrates by any conventional technique. Examples of such techniques include spraying, screen-printing, and pyrolyzable tapes. In forming the compositions into sprayable slurries, they are usually dispersed in a liquid organic medium such as alcohol to a sprayable viscosity. Another example of a slurry medium is 1–½ percent nitrocellulose in amyl acetate. Any of the conventional paste organic vehicles may be employed for forming a paste while conventional tapes may also be used.

Once the material is applied, it is dried and/or heated in accordance with conventional techniques to burn off the vehicle and then fired to devitrify the seal. A particularly preferred heat cycle for devitrifying a seal according to this invention comprises at heat up time of about 75°–100° C./min., a hold as indicated at peak temperature, and a cooldown rate of about 50°–60° C./min. Such a heat cycle usually insures a high quality seal and a reasonable minimization of weakening stresses being effected during cooling.

The following examples are presented by way of illustration rather than limitation.

EXAMPLE 1

A base glass is formulated from the following composition expressed in percent by weight:

| | Percent |
|---|---|
| $SiO_2$ | 2.00 |
| ZnO | 11.80 |
| PbO | 75.69 |
| $B_2O_3$ | 8.20 |
| BaO | 1.80 |

by melting the requisite amounts of raw batch ingredients in a platinum crucible at about 1,800° F. in an air atmosphere for one and one-half hours. The glass is then fritted and ground to a particle size such that greater than 70 percent by weight of the particles are less than 400 U.S. Series Sieve screen in size. After grinding, the glass powder has the following profile:

| % Ogives | Micron Size |
|---|---|
| 90 | 60 |
| 80 | 43 |
| 75 | 38 |
| 60 | 28 |
| 50 | 22 |
| 40 | 17 |
| 25 | 11 |
| 20 | 9.4 |
| 10 | 6.0 |
| 5 | 4.3 |
| 2 | 3.0 |
| Screen Mesh | % |
| 100 | <trace |
| 140 | 0.8 |
| 200 | 4.8 |

| | |
|---|---|
| 270 | 7.6 |
| 325 | 5.0 |
| 400 | 10.5 |
| −400 | 71.3 |

499 grams of this powder is then blended with 1 gram of the above-described glass composition previously crystallized to form a "master blend." The pre-crystallized glass composition is previously devitrified by taking 10 grams of the vitreous glass powder and pressing it at 1,000 psi into a ¾ inch diameter button which is thereafter heated at 450° C. for 2 hours to insure that devitrification is completed. The button is then fritted and ground to a particle size similar to that of the vitreous glass powder to which it is added. The "master blend" (500 grams) so formed is thoroughly mixed by ball milling for 15 minutes.

Separate from the "master blend" is formulated an admixture of 400 grams of the vitreous glass powder and 50 grams of beta-eucryptite previously ground to a particle size similar to the glass powder to which it is added. The "master blend" and beta-eucryptite containing powder are then blended together for 15 minutes using a paint shaker so that the final blend contains 0.02 percent by weight crystallized glass powder and 10 percent beta-eucryptite.

The powder is then formed into a printing paste by admixing it with an organic vehicle consisting of an organic binder and a liquid solvent therefore. The paste consists of a weight ratio of 6.5:1 powder to vehicle. The resulting paste is then screen-printed onto a base and cap of alumina (thermal coefficient expansion = 64 × $10^{-7}$ in./in./° C. 0–700° C.) using standard techniques and a screen of 80 mesh.

The printed coatings are then dried at 330° C. for 15 minutes to remove the organic solvent and fired at 440° C. for 6 minutes to drive off the organic binder. No substantial amount of crystallization takes place at this time. This second step is optional where an organic binder is present. In the case of an alcohol slurry, a single drying step of 125° C. for 15 minutes is all that is necessary. The base alumina substrate is then provided with conventional electronic lead frames while the cap alumina substrate is inverted upwardly and the base and lead frames brought into contact therewith. The package is then heated at a rate of 100° C./min. to a peak of 450° C. and held for 8 minutes at this temperature to crystallize the seal. The package is then completed by cooling at a rate of 60° C./min. to room temperature. The structure is then subjected to testing in accordance with the following Example.

EXAMPLE II

The structure formed in Example I was subjected to Military Standard Test No. 883 by using both test condition A to test for fine cracks and test condition C to test for large cracks. In conducting test condition A, the structure is placed in a pressure chamber and subjected to a He pressure of 75 psi for 1 hour after which the structure is removed and "rinsed" with $N_2$ gas. The structure is then tested in a standard Helium Leak Detector for traces of helium. In conducting test condition C, the structure after tested under condition A is submerged in a beaker of silicone oil at 125° C. and any bubbles emerging from the structure are observed.

When so tested, the structure under test condition A passed the test in that it indicated a helium leakage of less than 1 × $10^{-8}$cc/sec.He. The structure also passed test condition C in that no bubbles were observed.

In addition to the above testing, the structure was subjected to a thermal shock test consisting of initially submerging the structure in boiling water for 1 minute and then quenching an ice water within 5 seconds. The cycle is repeated four additional times. Test conditions A and C were then repeated and the structure again passed these tests, thus indicating the unusually strong nature of the sealing qualities of this invention despite the fact that the time-temperature factor is materially reduced over those known factors in the prior art.

EXAMPLE III

In order to illustrate the synergistic nature of this invention, a standard differential thermal analysis (D.T.A.) and differential scanning calorimetry test (D.S.C.) were run on several compositions including those representative of U.S. Pat. No. 3,250,631, co-pending application, Ser. No. 814,156, and this invention. These tests are adequately described in the publication by DuPont Instrument Products Division entitled DU PONT 900 DIFFERENTIAL THERMAL ANALYZER. The equipment used was that of this manual. The compositions tested and results are set forth in TABLE B.

TABLE B

| Constituents (% wt.) | 1 | 2 | 3 | 4 |
|---|---|---|---|---|
| BaO | 1.8 | 1.8 | 1.8 | 1.8 |
| $B_2O_3$ | 8.2 | 8.2 | 8.2 | 8.2 |
| PbO | 75.69 | 75.69 | 75.69 | 75.69 |
| $SiO_2$ | 2.00 | 2.00 | 2.00 | 2.00 |
| ZnO | 11.80 | 11.80 | 11.80 | 11.80 |
| % Ref. Oxide | 0 | 0 | 10 | 10 |
| % Cryst.Glass | 0 | 0.02 | 0 | 0.02 |
| DTA (major peaks min.) | 42.5 | 19.0 | 12.0 | 10.5 |
| Completion time (min.) | 54.5 | 25.0 | 41.5 | 23.5 |
| DSC | | | | |
| A. Major peak (min.) | 32.5 | 19.5 | 10.25 | 11.5 |
| B.Area under isothermal curve °C.min./100 gr. | 9.7 | 10.1 | 5.5 | 8.1 |
| Stress of seal | 3400T | 3400T | 400–750C | 1300C. |

The compositions included the base glass as indicated admixed in accordance with the techniques described above relative to blending, particle size and the like, with the indicated amount of additive. Thus the amount of additive given is that of the overall blended composition. In each instance, particle sizes between compositions were the same and the crystallized glass had a composition the same as that of the base glass employed. The pre-crystallized glass was devitrified by heating at 450° C. for 2 hours.

The relative stress data reported was measured by the conventional glass rod-stress technique wherein a small mound of the indicated glass is fired upon the end of a standard glass rod having a coefficient of expansion of 83 × $10^{-7}$ in./in./° C. and cooled. The heating range is 10° C./min. to 450° C. for 30 minutes then cooled at 5° C./min. to room temperature. The stress is measured by standard optical techniques. Compression indicates a lower coefficient of thermal expansion than the base glass while tension indicates a higher coefficient of thermal expansion. Since about 200 psi equals 1 expansion point, in order to form a strong seal with conventional alumina substrates (on the order of 60–80 × $10^{-7}$ in./in./° C.), the test should indicate a compression of greater than about 800 psi.

The results reported in the above table clearly shows the synergistic nature of this invention. Firstly, it can be seen that the beta-eucryptite example (No. 3) is in compression of about 400–750 psi. On the other hand, the precrystallized glass example (No. 2) is in tension of about 3,400 psi. One would therefore expect that if runs No. 2 and No. 3 were combined a stress either equal that of Run No. 3 or intermediate these two values and probably tending toward tension would result. To the contrary, and quite unexpectedly, not only does the combination, as per this invention, result in a compression much greater than even the beta-eucryptite alone, but is of such compression as to make it ideally suitable for use with alumina substrates conventional in microelectronic circuitry.

As a further indication of the unexpected synergistic effects of this invention is the DTA and DSC data taken as a whole. This data indicates that beta-eucryptite additive forms either a lower amount of crystals, different crystals or a combination of both than does either the base glass alone or with pre-crystallized glass added thereto (the two being of the same magnitude). Thus one would surmise that if beta-eucryptite were used with the pre-crystallized additive the composite would assume crystalline characteristics close to the beta-eucryptite since the pre-crystallized glass did not substantially affect the crystalline nature of the base glass used alone. Contrary to this expectation, and quite unexpectedly to the betterment of the system, the combination results in crystallization characteristics quite close to those of the base glass and base glass plus pre-crystallized glass either by way of quantity, type of crystallization or both. Such "familiar" as opposed to "foreign" crystallization greatly improves the quality of reproducibility which is one of the main detriments to the use of beta-eucryptite alone as an additive. Further indication of "foreign" crystallization was represented by a lack of a secondary peak for run No. 3 in the DSC test.

In addition to the above, not only does the combination unexpectedly do away with the detrimental effects of beta-eucryptite as evidence by the area under the isothermal curve, but it also unexpectedly lowers the time-temperature factor as evidenced by actual test results hereinbefore reported as well as the peak and completion time data from the DTA and DSC tests.

Note in this respect, that the combination is much faster than the swift pre-crystallized run (No. 2) despite the fact that beat-eucryptite (which results in a slower completion time than the pre-crystallized run, when used alone) is added thereto.

Once given the above examples, many other features, modifications and improvements will become apparent to those skilled in the art. Such other features, modifications, and improvements are considered to be a part of this invention, the scope of which is to be determined by the following claims:

We claim:

1. A solder glass composition comprising about 5–15 weight percent of a refractory oxide, about 0.0001–0.03 weight percent of a precrystallized lead-zinc-borate glass, and about 85–95 weight percent of an uncrystallized but crystallizable lead-zinc-borate glass, all particulate matter in said composition being less than about 100 U. S. Series Sieve screen in size, said solder glass composition possessing the properties of being capable of being fired at about 400°–500° C. for about 1–60 minutes to produce a substantially completely crystallized, hermetic seal, said seal having a compressive stress which is greater than seals formed from either a composition comprising only the pre-crystallized glass and the uncrystallized but crystallizable glass or a composition comprising only the refractory oxide and the uncrystallized but crystallizable glass when each of said compositions is fired on an alumina substrate.

2. A solder glass composition according to claim 1 wherein said pre-crystallized glass has the same composition as said crystallizable solder glass.

3. A solder glass composition according to claim 1 wherein said crystallizable glass and said pre-crystallized glass each comprises by weight about 0–3 percent BaO, 5–15 percent $B_2O_3$, 70–85 percent PbO, 0–10 percent $SiO_2$ and 5–20 percent ZnO.

4. A solder glass composition according to claim 3 wherein each of said glass compositions comprises by weight about: 1.5–2.5 percent BaO, about 8–9 percent $B_2O_3$, about 74–80 percent PbO, about 1–2.5 percent $SiO_2$ and about 10–13 percent ZnO.

5. A solder glass composition according to claim 4 wherein each of said glass compositions consists of by weight about 1.8 percent BaO, 8.2 percent $B_2O_3$, 75.7 percent PbO, about 2.0 percent $SiO_2$, and about 11.8 percent ZnO.

6. A solder glass composition according to claim 1 wherein the amounts by weight are: about 7–11 percent refractory oxide, about 0.02 percent pre-crystallized glass, and about 89–93 percent crystallizable glass.

7. A solder glass composition according to claim 1 wherein said refractory oxide is beta-eucryptite.

8. A solder glass composition according to claim 1 wherein the particle size of at least about 70 percent by weight of all constituents is less than about 400 U. S. Series Sieve screen but less than about 3.0 percent by weight are smaller than 3 microns.

9. A solder glass composition according to claim 5 wherein the amounts by weight are: about 7 – 11 percent refractory oxide, about 0.02 percent pre-crystallized glass, and about 89–93 percent crystallizable glass, said refractory oxide being beta-eucryptite.

10. A printing paste comprising the solder glass composition of claim 1 and an organic vehicle.

11. A printing paste comprising the solder glass composition of claim 9 and an organic vehicle.

12. A method of forming a tight, strong substantially hermetic seal between two substrates which comprises providing a layer of a composition between said substrates and heating said composition for about 1–60 minutes at a temperature of about 400°–500° C., said composition comprising about 5–15 weight percent of a refractory oxide, about 0.0001–0.03 weight percent of a precrystallized lead-zinc-borate glass, and about 85-95 weight percent of an uncrystallized but crystallizable lead-zinc-borate glass, all particulate matter in said composition being less than about 100 U. S. Series Sieve screen in size, said solder glass composition possessing the properties of being capable of being fired at about 400°–500° C. for about 1–60 minutes to produce a substantially completely crystallized, hermetic seal, said seal having a compressive stress which is greater than seals formed from either a composition comprising only the pre-crystallized glass and the uncrystallized but crystallizable glass or a composition comprising only the refractory oxide and the uncrystallized but crystallizable glass when each of said compositions is fired on an alumina substrate.

13. A method according to claim 12 wherein said heating is for about 8 minutes at about 450° C.

14. A method according to claim 13 wherein the amounts of ingredients are by weight: about 7–11 percent refractory oxide, about 0.02 percent pre-crystallized glass, and about 89–93 percent crystallizable glass.

15. A method according to claim 14 wherein said pre-crystallized glass has the same composition as said crystallizable glass and has a composition comprising by weight about: 1.5–2.5 percent BaO, about 8–9 percent $B_2O_3$, about 74–80 percent PbO, about 1–2.5 percent $SiO_2$ and about 10–13 percent ZnO.

16. A method according to claim 12 wherein the particle size of at least 70 percent by weight of all constituents is less than about 400 U. S. Series Sieve screen but less than about 3.0 percent by weight are smaller than 3 microns.

17. A method according to claim 16 wherein the solder glass composition is formulated by forming an intimate master blend of crystallized particles and a portion of said crystallizable glass particles comprising about 100–225 parts by weight of crystallized particles to one million parts by weight of said crystallizable particles and thereafter forming an intimate admixture of said master blend with the remaining portion of crystallizable particles and said refractory oxide.

18. A method according to claim 17 wherein at least one of said substrates is an alumina substrate in a microelectronic package.

* * * * *

UNITED STATES PATENT AND TRADEMARK OFFICE
CERTIFICATE OF CORRECTION

PATENT NO. : 3,778,242

DATED : December 11, 1973

INVENTOR(S) : Francel, Minneman and Nofziger

It is certified that error appears in the above-identified patent and that said Letters Patent are hereby corrected as shown below:

Col. 1, line 49, "determined" should be --detrimental--; Col. 2, line 57, "uncrsytallized" should be --uncrystallized--; Col. 3, line 40, "above" should be --about--; lines 41 and 42, "essentially" should be --especially--; Col. 4, line 44, "these" should be --those--; Col. 8, line 6, "an" should be --in--; Col. 9, line 49, "beat" should be --beta--; Col. 4, line 16, "is" should be --it--.

Signed and Sealed this

Nineteenth Day of April 1977

[SEAL]

*Attest:*

RUTH C. MASON
*Attesting Officer*

C. MARSHALL DANN
*Commissioner of Patents and Trademarks*